UNITED STATES PATENT OFFICE.

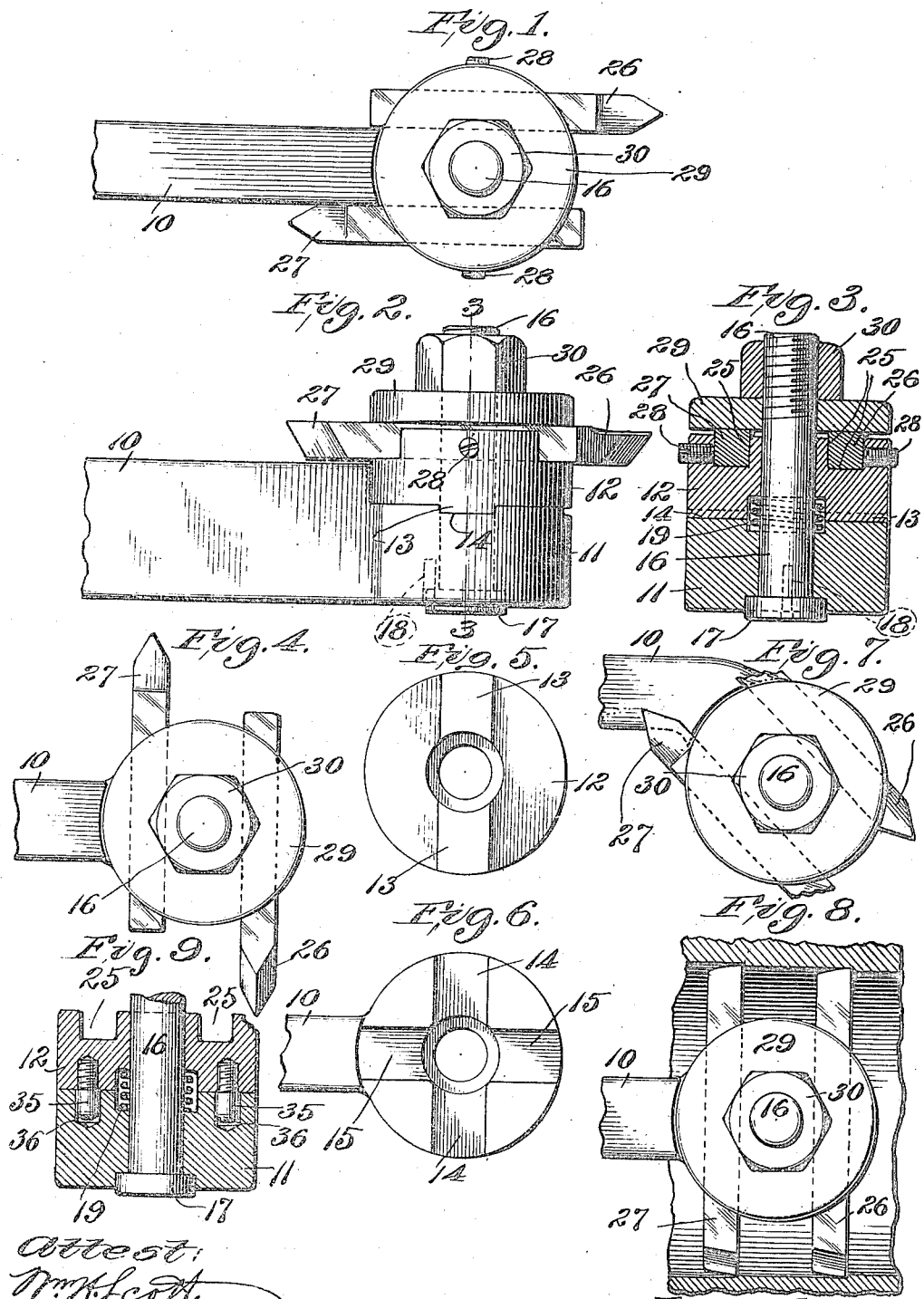

CHARLES A. SWAHLSTEDT, OF ST. LOUIS, MISSOURI.

UNIVERSAL TOOL-HOLDER.

1,248,201.  Specification of Letters Patent.  Patented Nov. 27, 1917.

Application filed September 18, 1914. Serial No. 862,312.

*To all whom it may concern:*

Be it known that I, CHARLES A. SWAHL-STEDT, a citizen of the United States, and residing at St. Louis, in the State of Missouri, have invented a certain new and useful Improvement in Universal Tool-Holders, of which the following is a specification.

This invention relates to tool holders, and more particularly, to tool holders of that type which are adapted to receive and hold self-hardening steel cutters.

In the operations of turning, planing, etc., it is necessary to take roughing and finishing cuts. In certain classes of work it is customary to use different tools for this purpose. The interchange of such tools not only requires considerable time, but also often results in inaccuracy of the work. Thus, when turning threads, unless the finishing tool is positioned very accurately, the threads will not be cut with the required accuracy. It will, of course, be obvious that, in such classes of work as thread cutting, the accurate positioning of the tool will require considerable time.

One of the objects of this invention, therefore, is to provide a tool holder which is constructed to receive a plurality of cutters, and which is so arranged that these cutters may be individually or collectively positioned at the cutting point with great accuracy.

Another object is to provide a tool holder adapted for universal application, for performing the various operations, such as, turning, planing, and boring.

Another object is to provide a tool holder which is simple in construction and operation, which consists of a few parts, which is not liable to get out of order, and which is cheap to manufacture.

Further objects will appear from the detail description taken in connection with the accompanying drawing, in which:

Figure 1 is a plan of a tool holder embodying this invention;

Fig. 2 is a side elevation;

Fig. 3 is a section on the line 3—3, Fig. 2;

Fig. 4 is a plan of the tool holder with the cutter head in a different position;

Fig. 5 is a detail bottom view of the cutter head;

Fig. 6 is a detail of the shank;

Fig. 7 is a plan of an offset tool holder;

Fig. 8 is a section through a piece of work, with the tool holder of Figs. 1 to 6 inclusive in position and performing the operation of boring; and, Fig. 9 is a section similar to Fig. 3, but showing another embodiment of this invention.

Referring to the accompanying drawing, 10 designates a shank which is, as usual, of rectangular form, so as to be received by and clamped in the usual tool post of the lathe, planer, shaper, etc. This shank has formed thereon an enlarged part 11 of substantially circular form, so as to receive the cutter head 12. The engaging face of the part 11 and the cutter head are machined to form, on the latter, a rib 13, and, on the former, recesses 14 and 15, adapted to receive the rib. A bolt 16, having a head 17, passes through alined holes in the shank and cutter head, and this bolt is held against rotation by means of a pin 18 engaging a groove in the head 17. A recess is formed in the coöperating faces of the shank and cutter head and around the bolt, so as to receive a spring 19, which bears, at one end, against the bottom of the recess in the shank part 11, and, at its other end, against the end of the recess in the cutter head.

The cutter head 12 has formed therein parallel recesses 25 positioned on each side of the bolt 16, and these recesses are adapted to receive cutters 26 and 27, of the usual self-hardening steel. Set screws 28 are adapted to locate and preliminarily clamp the cutters in position in the cutter head. As will be noted from Figs. 2 and 3, the depth of the recesses 25 is less than the thickness of the cutters, so that the top faces of these cutters will project a short distance above the top face of the cutter head. A washer or plate 29 is passed over the bolt, and the whole is clamped by a nut 30. This nut operates not only to securely clamp the cutters in the cutter head, but also to clamp or lock the cutter head on the shank, this head being positioned by the engagement of the rib 13 with one of the recesses 14 or 15.

When the parts are in the position shown in Figs. 1, 2 and 3, the cutter 26 will be in operative position to make a cut. At this time the cutters are securely clamped in the cutter head, and the cutter head is itself securely positioned and locked on the shank. After the cutter 26 has made its cut, which we may consider the roughing cut, the nut 30 is loosened sufficiently to permit the spring 19 to raise the rib out of the recess 14. The cutter head may now be swung through 180° to position the cutter 27 at the cutting point, and by then tightening the nut 30, the cutter head and its cutter will be firmly locked in position.

In Fig. 7, an offset tool holder is illustrated, but, since the operation of this tool holder is substantially the same as that shown in Figs. 1 to 3 inclusive, and since an offset tool holder is a well known device, no further description is necessary.

Figs. 4 and 8 show the tool holder with the cutter head in position so as to permit the cutters to perform a boring operation. In this operation, the cutter head is swung around with the cutters at right angles to the shank, so as to position the tongue 13 in the recesses 15. In this operation, both cutters may cut at the same time, the cutter 26 performing the roughing cut, and the cutter 27 following up with the finishing cut. The cutters may either be of the diamond point type, as shown in Fig. 4, or they may be of the usual boring type, as shown in Fig. 8.

In the construction shown in Fig. 9, the tongue and recesses are replaced by pins 35 on the cutter head 12 coöperating with recesses 36 in the shank part 11. The operation of this construction is obvious, and further description is, therefore, unnecessary.

It will thus be seen that the invention accomplishes its objects. A tool holder is produced in which successive roughing and finishing operations may be performed with a minimum of labor, and with great accuracy. The tool holder also has a universal application, adapting it to the various operations in which such a device is used.

Having thus described the invention, what is claimed is:

A tool holder comprising a shank adapted to be inserted in a tool post, a cutter head mounted on said shank to swing thereon, said head being slotted to receive a plurality of cutters, a plate bearing on said cutters, interlocking means between said head and said shank adapted to locate said head on said shank, means adapted to clamp said plate to said head and said head to said shank, and a spring between said head and said shank.

In testimony whereof I affix my signature in the presence of these two witnesses.

CHARLES A. SWAHLSTEDT.

Witnesses:
J. H. BRUNINGA,
GERTRUDE A. HEYMANN.